(12) United States Patent
Liang et al.

(10) Patent No.: US 6,788,452 B2
(45) Date of Patent: Sep. 7, 2004

(54) PROCESS FOR MANUFACTURE OF IMPROVED COLOR DISPLAYS

(75) Inventors: Rong-Chang Liang, Cupertino, CA (US); Zarng-Arh George Wu, San Jose, CA (US); Hongmei Zang, Sunnyvale, CA (US)

(73) Assignee: SiPix Imaging, Inc., Milpitas, CA (US)

( * ) Notice: Subject to any disclaimer, the term of this patent is extended or adjusted under 35 U.S.C. 154(b) by 45 days.

(21) Appl. No.: 10/310,641

(22) Filed: Dec. 4, 2002

(65) Prior Publication Data

US 2003/0174385 A1 Sep. 18, 2003

Related U.S. Application Data

(63) Continuation-in-part of application No. 10/284,586, filed on Oct. 30, 2002, which is a continuation of application No. 09/879,408, filed on Jun. 11, 2001, now Pat. No. 6,545,797.

(51) Int. Cl.$^7$ .............................................. G02B 26/00
(52) U.S. Cl. ........................ 359/296; 204/600; 430/32; 345/107
(58) Field of Search .......................... 359/296; 204/600, 204/450; 430/32, 34, 38; 345/105, 107; 264/4

(56) References Cited

U.S. PATENT DOCUMENTS

| | | | |
|---|---|---|---|
| 3,612,758 A | 10/1971 | Evans | ........................ 348/803 |
| 4,298,448 A | 11/1981 | Müller et al. | |
| 4,680,103 A | 7/1987 | Beilin Solomon I. et al. | |
| 4,732,830 A | 3/1988 | DiSanto et al. | |
| 5,930,026 A | 7/1999 | Jacobson et al. | |
| 5,961,804 A | 10/1999 | Jacobson et al. | |
| 6,017,584 A | 1/2000 | Albert et al. | ............. 427/213.3 |
| 6,067,185 A | 5/2000 | Albert et al. | ................ 359/296 |
| 6,319,381 B1 * | 11/2001 | Nemelka | ..................... 204/485 |
| 6,545,797 B2 | 4/2003 | Chen et al. | ................. 359/296 |
| 6,672,921 B1 | 1/2004 | Liang et al. | |
| 2002/0075556 A1 | 6/2002 | Liang et al. | ................ 359/296 |
| 2002/0126249 A1 | 9/2002 | Liang et al. | ................ 349/187 |
| 2002/0182544 A1 | 12/2002 | Chan-Park et al. | .......... 430/311 |
| 2003/0043450 A1 | 3/2003 | Liang et al. | ............... 359/296 |

FOREIGN PATENT DOCUMENTS

| | | |
|---|---|---|
| GB | 1313412 | 4/1973 |
| WO | WO 01/67170 A1 | 9/2001 |
| WO | WO 02/001281 | 1/2002 |
| WO | WO 02/056097 | 7/2002 |
| WO | WO 02/065215 | 8/2002 |

OTHER PUBLICATIONS

Chan–Park, M., et al., "Process for Roll–to–Roll Manufacture of a Display by Synchronized Photolithographic Exposure on a Substrate Web," Ser. No. 09/784,972—filed Feb. 15, 2001.

Hopper, M.A., et al., "An Electrophoretic Display, its Properties, Model, and Addressing," *IEEE Trans. Electr. Dev.*–26(8):1148–1152 (1979).

(List continued on next page.)

*Primary Examiner*—Hung Xuan Dang
*Assistant Examiner*—Tuyen Tra
(74) *Attorney, Agent, or Firm*—Heller Ehrman; White & McAuliffe LLP

(57) ABSTRACT

This invention relates to the field of electrophoretic displays. In particular, it relates to processes for the manufacture of multilayer color displays involving imagewise opening and filling display cells with display fluids of different colors. The color displays have improved contrast ratio, switching performance, reflectivity at the Dmin state and structural integrity.

51 Claims, 8 Drawing Sheets

OTHER PUBLICATIONS

USSN 09/518,488, filed Mar. 3, 2000 (available upon request); equivalent to WO01/67170*.

USSN 60/315,647 filed Aug. 28, 2001 (available upon request); now USSN 10/229,530; equivalent to Ref. #7.

USSN 60/367,325 filed Mar. 21, 2002 (available upon request); now USSN 10/394,488.

USSN 60/375,299 filed Apr. 23, 2002 (availbale upon request); now USSN 10/421,217.

* cited by examiner

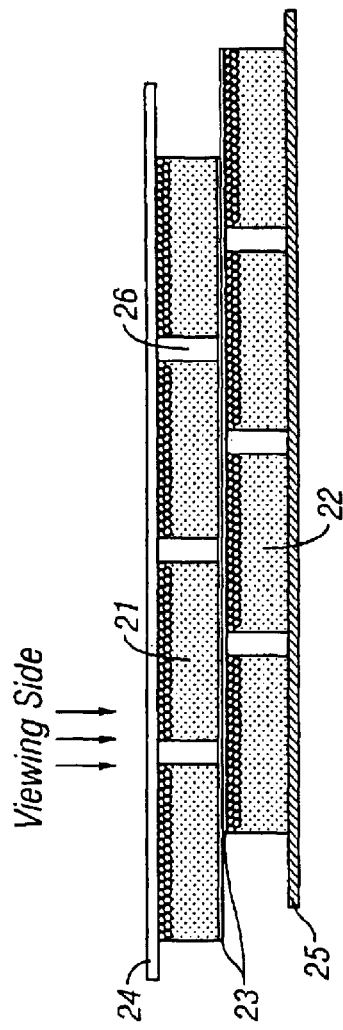
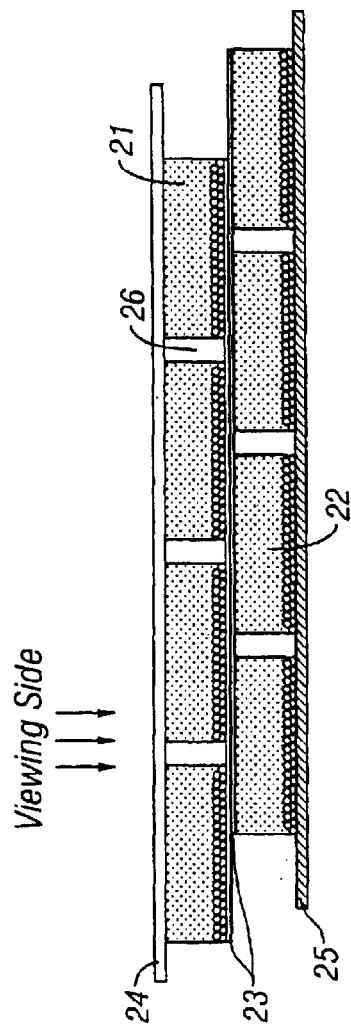
FIG. 2A
FIG. 2B

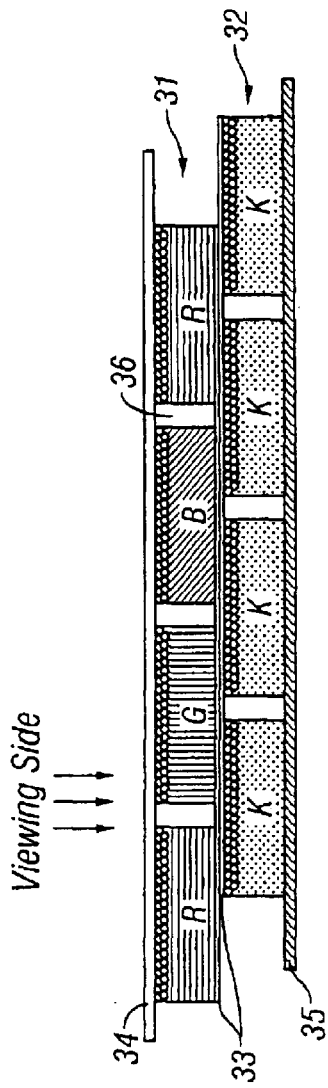
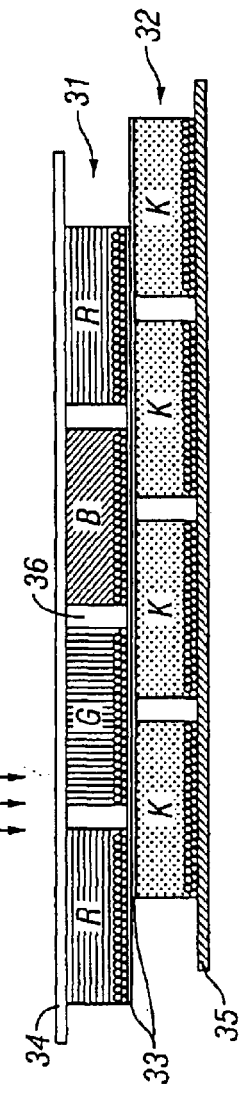
FIG. 3A
FIG. 3B

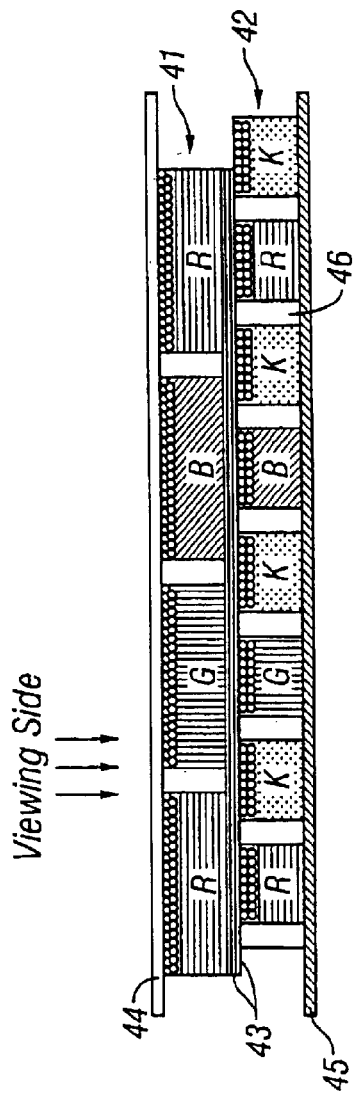
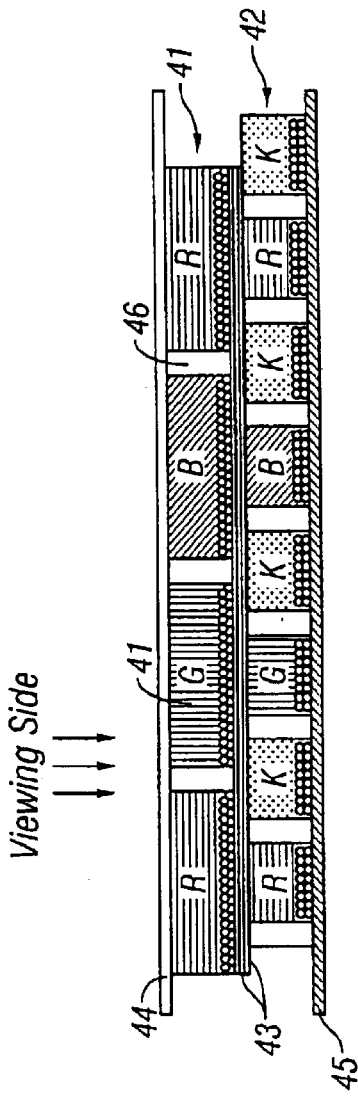
FIG. 4A
FIG. 4B

PROCESS FOR MANUFACTURE OF IMPROVED COLOR DISPLAYS

RELATED APPLICATION

This application is a continuation-in-part application of U.S. Ser. No. 10/284,586 filed on Oct. 30, 2002 which is a continuation of U.S. Ser. No. 09/879,408 filed on Jun. 11, 2001 now U.S. Pat. No. 6,545,797 the contents of both are incorporated herein by reference in their entirety.

FIELD OF INVENTION

This invention relates to the field of electrophoretic displays. In particular, it relates to processes for the manufacture of multilayer color displays involving imagewise opening and filling display cells with display fluids of different colors. The color displays have improved contrast ratio, switching performance, reflectivity at the Dmin state and structural integrity.

BACKGROUND OF THE INVENTION

The electrophoretic display is a non-emissive device based on the electrophoresis phenomenon of charged pigment particles suspended in a solvent. It was first proposed in 1969. The display usually comprises two plates with electrodes placed opposing each other, separated by using spacers. One of the electrodes is usually transparent. A suspension composed of a colored solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

In order to prevent undesired movement of the particles, such as sedimentation, partitions between the two electrodes were proposed for dividing the space into smaller cells (see M. A. Hopper and V. Novotny, IEEE Trans. Electr. Dev., 26(8):1148–1152 (1979)). However, in the case of partition-type electrophoretic displays, difficulties were encountered in the formation of the partitions and the process of enclosing the suspension. Furthermore, it was also difficult to keep suspensions of different colors separate from each other in the partition-type electrophoretic display.

Another type of EPD (see U.S. Pat. No. 3,612,758) has electrophoretic cells that are formed from parallel line reservoirs (the channel or groove type). The filling and sealing of electrophoretic fluid in the channels are accomplished by a batch-wise process. In addition, the problem of undesirable particle movement or sedimentation, particularly in the longitude direction, remains an issue.

Subsequently, attempts were made to enclose the suspension in microcapsules. U.S. Pat. Nos. 5,961,804, 5,930,026 and 6,017,584 describe microencapsulated electrophoretic displays. The microcapsule type display has a substantially two dimensional arrangement of microcapsules each having therein an electrophoretic composition of a dielectric fluid and a suspension of charged pigment particles that visually contrast with the dielectric solvent. The microcapsules can be formed by interfacial polymerization, in-situ polymerization or other known methods such as physical processes, in-liquid curing or simple/complex coacervation. The microcapsules, after their formation, may be injected into a cell housing two spaced-apart electrodes, or "printed" onto or coated on a transparent conductor film. The microcapsules may also be immobilized within a transparent matrix or binder that is itself sandwiched between the two electrodes.

The electrophoretic displays prepared by these prior art processes, in particular, the microencapsulation process as disclosed in U.S. Pat. Nos. 5,961,804, 5,930,026 and 6,017,584, have many shortcomings. For example, the electrophoretic display manufactured by the microencapsulation process suffers from sensitivity to environmental changes (in particular, sensitivity to moisture and temperature) due to the wall chemistry of the microcapsules. Secondly, the electrophoretic display based on the microcapsules has poor scratch resistance due to the thin wall and large particle size of the microcapsules. To improve the handleability of the display, microcapsules are embedded in a large quantity of polymer matrix which results in a slow response time due to the large distance between the two electrodes and a low contrast ratio due to the low payload of pigment particles. It is also difficult to increase the surface charge density on the pigment particles because charge-controlling agents tend to diffuse to the water/oil interface during the microencapsulation process. The low charge density or zeta potential of the pigment particles in the microcapsules also results in a slow response rate. Furthermore, because of the large particle size and broad size distribution of the microcapsules, the prior art electrophoretic display of this type has poor resolution and addressability for color applications.

An improved EPD technology was recently disclosed in co-pending applications, U.S. Ser. No. 09/518,488 filed on Mar. 3, 2000 (corresponding to WO01/67170), U.S. Ser. No. 09/759,212 filed on Jan. 11, 2001 (corresponding to WO02/56097), U.S. Ser. No. 09/606,654 filed on Jun. 28, 2000 (corresponding to WO02/01280) and U.S. Ser. No. 09/784,972 filed on Feb. 15, 2001 (corresponding to WO02/65215), all of which are incorporated herein by reference. The improved EPD comprises isolated cells formed from microcups of well-defined shape, size and aspect ratio and filled with charged pigment or pigment-containing particles dispersed in a dielectric solvent, preferably a fluorinated solvent or solvent mixture. The filled cells are individually sealed with a polymeric sealing layer, preferably formed from a composition comprising a material selected from a group consisting of thermoplastics, thermoplastic elastomers, thermosets and their precursors.

The microcup structure enables a format flexible and efficient roll-to-roll continuous manufacturing process for the preparation of EPDs. The displays can be prepared on a continuous web of a conductor film such as ITO/PET by, for example, (1) coating a radiation curable composition onto the ITO/PET film, (2) forming the microcup structure by a microembossing or photolithographic method, (3) filling the electrophoretic fluid into the microcups and sealing the filled microcups, (4) laminating the sealed microcups with the other conductor film and (5) slicing and cutting the display to a desirable size or format for assembling.

One advantage of this type of EPD is that the microcup wall is in fact a built-in spacer to keep the top and bottom substrates apart at a fixed distance. The mechanical properties and structural integrity of microcup displays are significantly better than any prior art displays including those manufactured by using spacer particles. In addition, displays involving microcups have desirable mechanical properties including reliable display performance when the display is bent, rolled or under compression pressure from, for example, a touch screen application. The use of the microcup technology also eliminates the need of an edge seal adhesive which would limit and predefine the size of the display panel and confine the display fluid inside a predefined area. The display fluid within a conventional display prepared by the edge sealing adhesive method will leak out completely if the display is cut in any way, or if a hole is drilled through the display. The damaged display will be no longer functional. In contrast, the display fluid within the display prepared by the microcup technology is enclosed and isolated in each cell. The microcup display may be cut to almost any dimensions without the risk of damaging the display performance due to the loss of display fluid in the active areas. In other words, the microcup structure enables a format flexible display manufacturing process, wherein the process produces a continuous output of displays in a large sheet format which can be cut into any desired size and format. The isolated microcup or cell structure is particularly important when cells are filled with fluids of different specific properties such as colors and switching rates. Without the microcup structure, it will be very difficult to prevent the fluids in adjacent areas from intermixing or being subject to cross-talk during operation.

In order to achieve a higher contrast ratio, one of two approaches may be taken: (1) using a darkened background to reduce the light leaking through the inactive partition wall or (2) using a microcup of wider opening and narrower partition to increase the payload. However, the darkened background typically results in a lower reflectivity at the Dmin state. On the other hand, display cells formed from wider microcups and narrower partition walls tend to have a poor resistance against compression and/or shear forces imposed by, for example, a sharp stylus for a touch screen panel.

Substructures within microcup have been disclosed in a copending patent application, U.S. Ser. No. 60/315,647 filed on Aug. 28, 2001, to improve the mechanical properties and image uniformity of displays made from microcups having wide openings and narrow partition walls. However, the manufacturing of such microcups with substructures is very costly and more importantly, the trade-off between contrast ratio and reflectivity at the Dmin state remains unresolved.

SUMMARY OF THE INVENTION

The present application is directed to processes for the manufacture of a multilayer color display having improved contrast ratio, switching performance, reflectivity at the Dmin state and structural integrity.

The novel processes involve the sequence of filling a microcups array with a removable temporary filler material, coating onto the filled microcups a positively working photoresist, imagewise exposing and developing the photoresist, removing the filler material during or after the photoresist development process, filling the emptied microcups with a colored display fluid and finally sealing the filled microcups with a polymeric sealing layer. The same iterative process is then performed in different areas with different colored display fluids for the formation of a single layer of a full color display panel.

After two layers of such display panels are prepared, one of the two layers is laminated over the other layer to form a multiplayer color display.

The steps of adding and removing the temporary filler material serve to maintain structural integrity of the photoresist layer coated on the microcups in the non-imaging areas, particularly for the photoresist coated on microcups having large and deep openings such as those having a diameter or length in the range of about 50 to about 300 $\mu$m and a depth in the range of about 5 to about 200 $\mu$m, in particular about 10 to 50 $\mu$m. The steps also eliminate the need of a tenting adhesive layer between the photoresist and the microcup array.

The same processes are also useful for other types of multicolor electrophoretic displays including the groove or channel type electrophoretic displays. Typical dimension of grooves or channels useful for the present invention is: 5 to 200 $\mu$m (depth)×10 to 300 $\mu$m (width or diameter)×300 $\mu$m to 90 inches (length); preferably 10 to 50 $\mu$m (depth)×50 to 120 $\mu$m (width or diameter)×1000 $\mu$m to 40 inches (length). For long grooves or channels, it is preferable to apply an edge seal adhesive to block both edges of the groove or channel before the coating of the filling material and photoresist into the grooves or channels.

The manufacturing processes of this invention provide a much wider process and material latitude. Therefore display media or suspensions of various colors, compositions, liquid crystals or any other suitable display fluids for generating multicolor displays known in the art may be used. The processes are simple and efficient and provide multi-color displays with improved contrast ratio, switching performance, reflectivity at the Dmin state and structural integrity at significantly lower processing cost, with less defects, of higher yields and no cross-talk among neighboring color fluids. The multi-step processes may be carried out efficiently under roll-to-roll manipulation or processing. They may also be carried out in batch operations or conveyed through continuous or semi-continuous operations.

BRIEF DESCRIPTION OF DRAWINGS

FIGS. 2–4 illustrate the multiplayer color displays which may be prepared by the processes of the present invention. FIGS. 2a and 2b show the "on" (Dmin) and "off" (Dmax) states, respectively, of a two-layer electrophoretic display. At the Dmin state, white particles of both layers will be attracted to the top of the microcups. The inactive partition areas of the upper layer will appear white since light is reflected back by the white particles in the bottom microcup layer. In contrast, at the Dmax state, white particles of both layers are attracted to the bottom of the microcups, the inactive partition areas of the upper layer will appear colored since light is absorbed by the colored solvent in the bottom microcup layer. FIGS. 3a and 3b show a two-layer color electrophoretic display wherein the top layer comprises microcups filled with red, green and blue electrophoretic fluids and the bottom layer comprises microcups filled with a black electrophoretic fluid. FIGS. 4a and 4b show a two-layer full color electrophoretic display wherein the top layer comprises microcups filled with red, green and blue electrophoretic fluids and the bottom layer comprises microcups filled with red, green, blue and black electrophoretic fluids. The red, green, blue and inactive partition areas of the upper layer are overlapped with registration to the red, green, blue and black microcups of the lower layer, respectively.

FIG. 5a illustrates the microcups formed from a composition comprising a thermoplastics, thermoset or their precursors on a conductor film and substrate. FIG. 5b illustrates the microcup array filled with a removable filler material with an overcoating comprising a positive photoresist. FIG. 5c illustrates the result of the first selective imagewise exposure of the positive photoresist by radiation, and subsequent development to remove the exposed positive photoresist and the filler material, producing opened microcups. FIG. 5d illustrates the result of the first filling of the opened microcups with a first color display fluid and subsequent sealing of the filled microcups. FIG. 5e illustrates the result of the second selective imagewise exposure of the positive photoresist by radiation, and subsequent development to remove the exposed positive resist and the filler material, producing another set of opened microcups. FIG. 5f illustrates the result of the second filling of the opened microcups with a second color display fluid and subsequent sealing of the filled microcups. FIG. 5g illustrates the third selective imagewise exposure of the positive photoresist by radiation, and subsequent development to remove the exposed positive photoresist and the filler material, producing a third set of opened microcups. FIG. 5h illustrates the result of the third filling of the opened microcups with a third color display fluid and subsequent sealing of the filled microcups.

FIG. 6a shows a process of preparing a two-layer electrophoretic display by laminating two microcup layers with the sealing sides of the microcups facing each other. FIG. 6b shows another process of preparing a two-layer electrophoretic display by (i) transferring a microcup layer from a release substrate onto a second microcup layer on a conductor film and (ii) laminating the resultant composite film onto a conductor film, optionally with an adhesive. The process (i) may be repeated to prepare an electrophoretic display having more than two layers of display cells.

DETAILED DESCRIPTION OF THE INVENTION

Definitions

The term "microcup" refers to the cup-like indentations created by microembossing, imagewise exposure or pre-punched holes.

The term "well-defined", when describing the microcups or cells, is intended to indicate that the microcup or cell has a definite shape, size and aspect ratio which are pre-determined according to the specific parameters of the manufacturing process.

The term "aspect ratio" is a commonly known term in the art of electrophoretic displays. In this application, it refers to the depth to width or depth to length ratio of the cells.

The term "Dmax" refers to the maximum achievable optical density of the display.

The term "Dmin" refers to the minimum optical density of the display background.

The term "contrast ratio" is defined as the ratio of the % reflectance of an electrophoretic display at the Dmin state to the % reflectance of the display at the Dmax state.

The term "staggered" is used to describe the arranged of multiple layers in which the inactive partition areas of one layer are at least partially overlapped with the active cell areas of the layer above or underneath, preferably completely overlapped. The staggered arrangement is necessary to allow the colors from the cells (generated by reflection or absorption of light) in a lower layer to be seen through the partition areas of an upper layer.

The term "display fluid", in the context of the present application, broadly covers the electrophoretic display fluid, the liquid crystal display fluid, display fluid comprising magnetic particles or any other display fluids known in the art.

I. The Multilayer Electrophoretic Display

Figure 1:
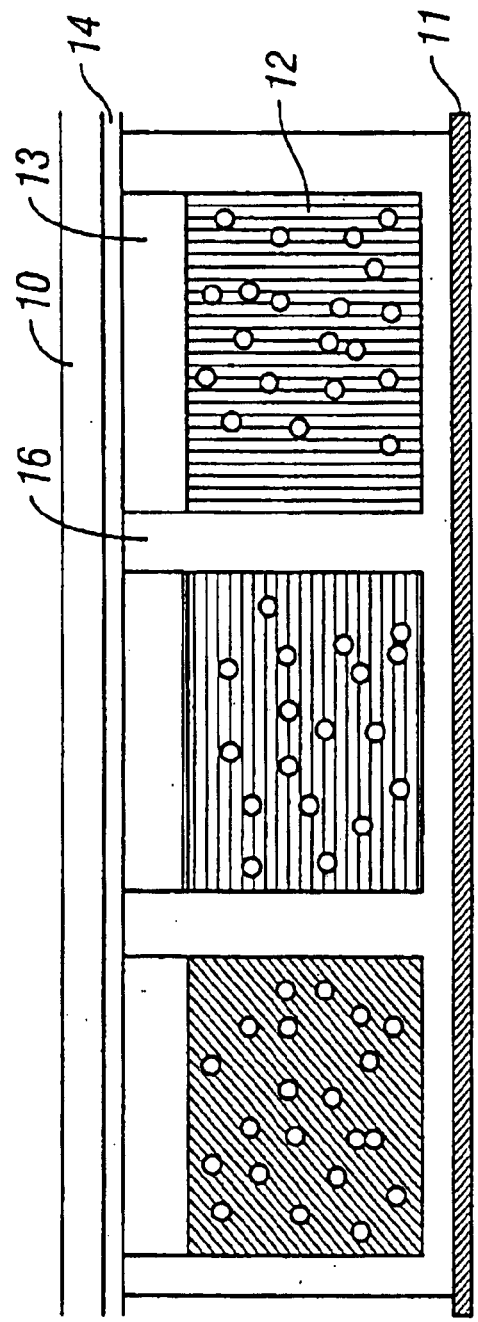
FIG. 1 shows a typical electrophoretic display cell prepared by the microcup technology with a darkened background to improve the contrast ratio. In both the "on" and "off" states, the viewer will see the background color through the inactive partition areas. A display having a low reflectivity in the Dmin state is obtained.

Electrophoretic display cells prepared by the microcup technology, as shown in FIG. 1, comprise two electrode plates (10, 11), at least one of which is transparent (10), and a layer of cells (12) enclosed between the two electrodes. The cells are filled with charged pigment or pigment-containing particles dispersed in a colored dielectric solvent and sealed with a sealing layer (13). Not shown in FIG. 1, the sealing layer preferably extends over the partition walls (16) and forms a contiguous layer thereon. The sealed cells are laminated onto the second conductor plate or film (10) optionally with an adhesive layer (14). When a voltage difference is imposed between the two electrodes, the charged particles migrate to one side, such that either the color of the pigment or the color of the solvent is seen through the transparent conductor plate or film (10). In addition, at least one of the two conductor films is patterned. To improve the contrast ratio of the EPD, one of two approaches are typically taken: (a) using microcups of a higher payload (a higher aspect ratio and/or a higher ratio of opening area to total area) or (b) using a blackened conductor film (11) on the non-viewing side. Since no light scattering particles are present in the inactive partition areas (16), the viewer will see the background color through the partition areas in both the "on" and "off" states. The blackened background of such a single layer EPD results in a higher Dmax and contrast ratio, but a lower reflectivity in the Dmin state. Moreover, the use of high payload cells, on the other hand, increases not only the degree of difficulty in manufacturing but also the cost of manufacturing.

The trade-off between contrast ratio and reflectivity in the Dmin state is eliminated in the staggered two-layer structure depicted in FIGS. 2a and 2b. In the two figures, the display has an upper cell layer (21) and a lower cell layer (22). The cells of the two layers are individually sealed with a sealing layer (23). The two layers are arranged in a staggered fashion and the sealing sides of the two layers face each other. The two-layer structure is sandwiched between a top transparent conductor film (24) and a bottom conductor film (25).

At the "on" state (FIG. 2a), the white particles in both upper and lower layers are attracted to the top of the cells (toward the viewing side). The partition areas (26) of the top layer will appear "white" since light is reflected back by the particles in the lower layer. In contrast, at the "off" state (FIG. 2b), the white particles in both layers are attracted to the bottom of the cells (toward the non-viewing side). The partition areas of the top layer will appear "colored" since light is absorbed by the colored dielectric solvent in the lower layer. As a result, Dmax and contrast ratio of the display may be improved without the trade-off in the reflectivity in the Dmin state.

The two-layer or multilayer EPD also allows the use of a cell with a lower payload (a lower aspect ratio and a lower ratio of opening area to total area) to achieve a high contrast ratio with a higher reflectivity at the Dmin state. This significantly improves the release properties of the embossing process and reduces the cost and degree of difficulty in the mold making process.

FIGS. 3a and 3b show a two-layer color electrophoretic display wherein the top layer (31) comprises display cells filled with red, green and blue electrophoretic fluids and the bottom layer (32) comprises display cells filled with a black electrophoretic fluid. In both figures, the inactive partition areas (36) of the upper layer (31) are staggered with the active cell areas of the lower layer (32). The two layer structure is sandwiched between two conductor films (34) and (35). At least one of the two conductor plates or films is transparent.

FIGS. 4a and 4b show a two layer full color electrophoretic display wherein the top layer (41) comprises display cells filled with red, green and blue electrophoretic fluids and the bottom layer (42) comprises display cells filled with red, green, blue and black electrophoretic fluids. The colored cells and the inactive partition areas (46) of the two layers are arranged in a staggered manner so that the red, green, blue and inactive partition areas of the top layer (41) are overlapped with registration to the red, green, blue and black microcups of the bottom layer (42), respectively. The two-layer structure is sandwiched between two conductor films (44) and (45). At least one of the two conductor films is transparent.

In the two-layer structure, the top microcup layer may be laminated onto the bottom layer at an appropriate angle to avoid formation of the undesirable Moire pattern. Alternatively, a less symmetrical microcup array may be used for similar purpose.

The pigment or pigment-containing particles or the colorant particles may also be magnetic. In one embodiment, a two-layer electromagnetophoretic display may have a bottom layer comprises display cells which are filled with an electromagnetophoretic fluid comprising a mixture of black magnetic particles and white non-magnetic particles dispersed in a colorless clear solvent or solvent mixture. The top layer may comprise red, green and blue cells which are filled with electrophoretic fluids comprising white particles dispersed in red, green and blue solvents, respectively. Alternatively, the top layer may comprise display cells which are filled with an electrophoretic fluid comprising a mixture of white and black particles dispersed in a colorless clear solvent or solvent mixture.

Details of the electromagnetophoretic display layer are disclosed in pending applications, U.S. Ser. No. 60/367,325 filed on Mar. 21, 2002 and U.S. Ser. No. 60/375,299 filed on Apr. 23, 2002, the contents of which are incorporated herein in their entirety by reference.

The same processes are also useful for other types of electrophoretic displays including the groove or channel type electrophoretic displays. Typical dimension of grooves or channels useful for the present invention is: 5 to 200 $\mu$m (depth)×10 to 300 $\mu$m (width or diameter)×300 $\mu$m to 90 inches (length); preferably 10 to 50 $\mu$m (depth)×50 to 120 $\mu$m (width or diameter)×1000 $\mu$m to 40 inches (length). For long grooves or channels, it is preferable to apply an edge seal adhesive to block both edges of the groove or channel before the coating of the filling material and photoresist into the grooves or channels.

In general, the cell gap or the shortest distance between the two electrodes in a multilayer display may be in the range of 15 to 200 $\mu$m, preferably in the range of 20 to 50 $\mu$m. The thickness of each display cell layer may be in the range of 5 to 100 $\mu$m, preferably in the range of 10 to 30 $\mu$m. The concentration of particles and dyes or colorants in each display cell layer may also vary for different applications.

II. Preparation of a Single Layer Color Electrophoretic Display Panel Preparation of the Microcups The microcup-based display cells may be prepared by either microembossing, photolithography or pre-punched holes as taught in copending patent applications, U.S. Ser. No. 09/518,488 filed on Mar. 3, 2000 (corresponding to WO01/67170), U.S. Ser. No. 09/942,532 filed on Aug. 29, 2002 (US Publication No. 2002-75556 published on Jun. 20, 2002), U.S. Ser. No. 09/759,212 filed on Jan. 11, 2001 (corresponding to WO02/56097), U.S. Ser. No. 09/606,654 filed on Jun. 28, 2000 (corresponding to WO02/01280) and U.S. Ser. No. 09/784,972 filed on Feb. 15, 2001 (corresponding to WO02/65215), all of which are incorporated herein by reference.

In general, the microcup-based cells can be of any shape, and their sizes and shapes may vary. The cells may be of substantially uniform size and shape in one system. However, in order to maximize the optical effect, cells having a mixture of different shapes and sizes may be produced. For example, cells filled with a dispersion of the red color may have a different shape or size from the green cells or the blue cells. Furthermore, a pixel may consist of different numbers of cells of different colors. For example, a pixel may consist of a number of small green cells, a number of large red cells and a number of small blue cells. It is not necessary to have the same shape and number for the three colors.

The openings of the microcups may be circular, square, rectangular, hexagonal or any other shape. The partition areas between the openings are preferably kept small in order to achieve high color saturation and contrast ratio while maintaining desirable mechanical properties. Consequently, the honeycomb-shaped opening is preferred over, for example, the circular opening.

For reflective electrophoretic displays, the dimension of each individual microcup may be in the range of about $10^2$ to about $10^6$ $\mu m^2$, preferably about $10^3$ to about $10^5$ $\mu m^2$. The depth of the microcups may be in the range of about 3 to about 100 $\mu$m, preferably from about 10 to about 50 $\mu$m. The ratio of opening area to total area may be in the range of about 0.1 to about 0.95, preferably about 0.4 to about 0.90. The width of the partition between microcups may be in the range of from about 2 to about 50 $\mu$m, preferably about 5 to about 20 $\mu$m.

Figure 5A:
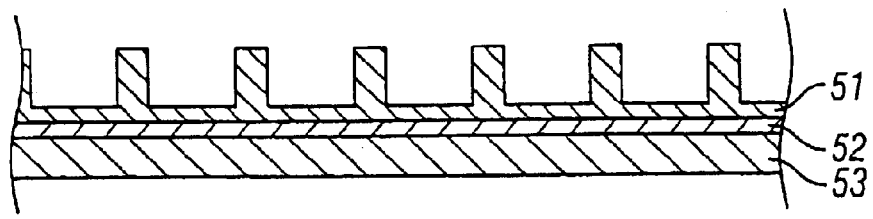
FIGS. 5a–5h illustrate the process of the present invention for the manufacture of a single layer of display panel.
Figure 5B:
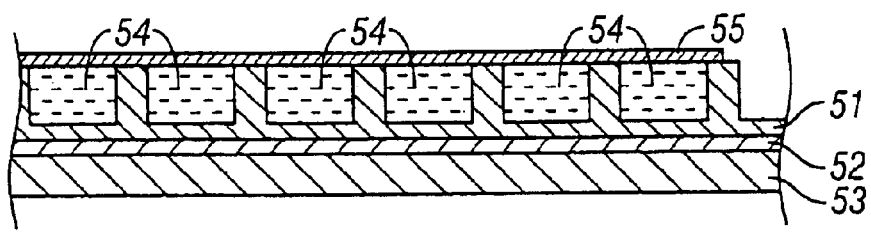

FIG. 5a illustrates the microcups formed from a composition comprising a thermoplastics, thermoset or their precursors (51) on a conductor plate or film (52). The conductor film may be coated on a substrate (53). In the preparation of a single layer of a full color display panel as shown in FIGS. 5b–5h, the microcups are first filled with a removable temporary filler material (54) and overcoated with a layer comprising a positive photoresist (55).

Suitable filler materials should meet the following criteria: (a) they do not react with or adversely affect the integrity of the microcups or the unexposed photoresist; (b) they can be readily removed during or after the development of the photoresist using, for example, a developer or cleaning solution. The filler materials should be soluble or dispersible in the cleaning solution. The cleaning solution must not adversely affect or react with the microcups or the positive photoresist. Suitable cleaning solutions include acidic or basic solutions (as developers for the positive photoresist) and aqueous or non-aqueous solvents or solvent mixtures.

Suitable filler materials include inorganic, organic, organometallic, polymeric materials or their particulates. Nonexclusive examples of filler materials may also include water-dispersible or soluble polymers such as AQ branched polyesters (Eastman Chemical Company), Carboset® Polymers (BF Goodrich), polyvinylpyrrolidone, poly(vinyl alcohol), poly(4-vinyl phenol), novolac resin and their copolymers. In one embodiment, filler materials may be non-film forming particles such as latexes of PMMA, polystyrene, polyethylene and their carboxylated copolymers and their corresponding salts, wax emulsions, colloidal silica, titanium oxide, calcium carbonate dispersions and mixtures thereof. In another embodiment, filler materials may include aqueous dispersions of ionomers of ethylene copolymers such as ACqua220, ACqua240, and ACqua250 (Honeywell, N.J.). ACqua220 and 250 can be removed with conventional alkaline cleaners including the developer used for typical novolac positive photoresists. ACqua240 can be removed with hot or cold water.

The dispersability or solubility of the filler materials, particularly the particulate filler materials, may be enhanced by the use of additives such as surfactants, dispersing agents, KOH, triethanolamine, aromatic or aliphatic bases, aromatic or aliphatic acids, pre-exposed positive novolac photoresists and water soluble polymers such as polyethylene glycol, polyvinyl alcohol, polyvinylpyrrolidone, polyvinylpyridine, polyacrylic acid, polymethacrylic acid, polyacrylamide or their copolymers.

It has been found that the use of positive photoresist as a filler material is useful in the selective opening, filling and sealing of relatively shallow microcups. If the microcups are totally filled with unexposed positive photoresist, the microcup depth may be less than 10 microns, preferably less than 5 microns. For deeper microcups, a positive photoresist can be under-coated into the microcups, exposed and then over-coated with a layer of the positive photoresist.

The microcups containing the filler material are over-coated with a positive photoresist by using Myrad bar, gravure, doctor blade, slot coating, slit coating or similar devices.

A variety of commercially available positive photoresists are suitable for the process. Examples include novolac based photoresists such as S-1818, SJR-1075, SJR-3000, SJR-5440, SJR-5740, APEX®-E DUV (Shipley Company), AZ-9260, AZ4620, AZ4562 (AZ Electronic Materials, Clariant AG) and THB-Positive (JSR Microelectronics). In the case that the positively working photoresist itself is also the filler, the photoresist used for thick coating, such as SJR-5440, SJR-5740 and those containing the t-BOC component, may be used.

In overcoating of the microcups, an excess of photoresist is usually applied to ensure that the microcups are fully covered by the photoresist. Preferably, application of the photoresist over the filled microcups is made such that the thickness of the photoresist layer above the top surface of the microcups may be controlled to be within a range of about 0.1 to about 5 microns, preferably about 0.5 to about 3 microns.

The excess photoresist over the microcups may be removed using a number of methods known in the art, including scraping with a wiper blade or similar devices.

The photoresist is then baked in an oven by using standard procedures as suggested by photoresist suppliers.

Subsequent imagewise exposure of the photoresist may be performed using a UV light source such as Loctite Zeta 7410 exposure unit equipped with a metal halide lamp with an intensity of about 6 mW/cm$^2$ at 365 nm or ORIEL 87000 Series UV System equipped with 500 watts Model 68810 Mercury ARC Lamp with an intensity of about 5 mW/cm$^2$ at 365 nm. Exposure is performed for a period of time sufficient to show image discrimination with good contrast after the photoresist is developed by a developer.

A synchronized exposure mechanism as described in WO02/65215 may be used. In effect, the photomask loop is "rolled" in a synchronized motion relative to the web, so as to maintain alignment and registration between the mask and the web during exposure. In a continuous synchronized motion and exposure process, the web and mask are moved at the same speed in the same direction during exposure in order to maintain this constant alignment and registration. Imagewise exposure of the photoresist on selected discrete microcups can be achieved precisely and continuously on the web.

Figure 5C:
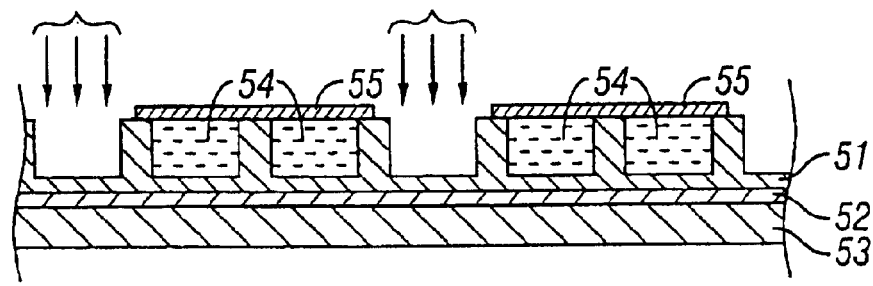

The exposed positive photoresist on selected microcups is developed and removed using a developer such as Developer-351 and 453 (Shipley Company, Marlborough, Mass.). The opened microcups may then be thoroughly washed with distilled water or a dilute developer solution to remove the filler material. Surfactants, such as Triton X-100 (Union Carbide), Aerosol OT or sodium dodecylbenzene sulfonate, may be added to improve the efficiency of removal of the filler material in the exposed areas. The developed and cleaned microcups are then dried by using air flow, heat or vacuum, etc. The selective imagewise exposure of the positive photoresist by radiation, development and removal of the coating and removal of the filler material are illustrated in FIG. 5c.

The opened microcups are then filled with the first color display fluid (56), optionally containing a thermoplastic or thermoset precursor (see below), using standard coating methods as those used to coat the photoresist and filler material onto the microcups. Alternatively, the filling may be accomplished by methods such as screen printing, gravure printing, inkjet printing or the like. The color display fluid may be any fluids and suspensions known in the art, including color electrophoretic fluids as described in WO01/67170 and WO02/65215 and liquid crystals containing dichroic dyes of various colors.

The filled microcups are then sealed with a sealing layer (57). Sealing of the microcups can be accomplished by a variety of methods described in WO01/67170 and WO02/65215. In one of the preferred embodiments, sealing may be accomplished by first dispersing the sealing composition comprising a polymer or polymer precursor and optionally a solvent or solvent mixture, in the display fluid. The sealing composition is immiscible with the display fluid and has a specific gravity no greater than that of the display fluid. After filling the microcups with the sealing composition/display fluid dispersion, the sealing composition phase separates from the color display fluid and forms a supernatant layer which is then hardened or cured by, for example, solvent evaporation, interfacial reaction, moisture, heat or radiation. Preferably, the sealing layer is hardened by radiation, such as UV, after or during solvent evaporation if a solvent is present, although a combination of two or more methods as described above may be used to increase the throughput of the sealing step. To minimize undesirable phase separation of the sealing composition before the filling step, the sealing composition may be in-line blended with the display fluid immediately before the filling step.

Alternatively, sealing of the microcups may be accomplished by overcoating the display fluid with the sealing composition. The sealing is accomplished by hardening the precursor by solvent evaporation, interfacial reaction, moisture, heat, radiation or a combination of various curing or hardening mechanisms. Preferably, the overcoating solution is lighter than the display fluid and has a limited miscibility with the latter to reduce the degree of intermixing during coating. Good coating uniformity and satisfactory adhesion between the sealing layer and the microcup array can be achieved by carefully adjusting surface tension and viscosity of the overcoating solution.

Figure 5D:
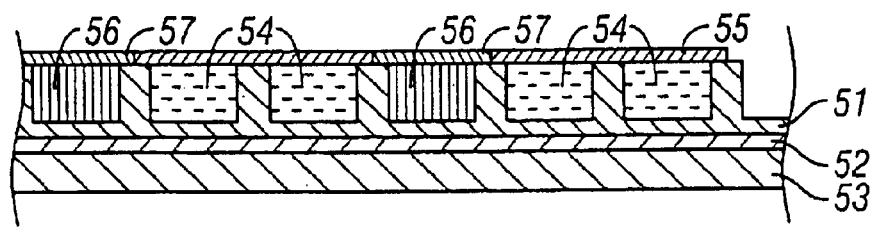
Figure 5E:
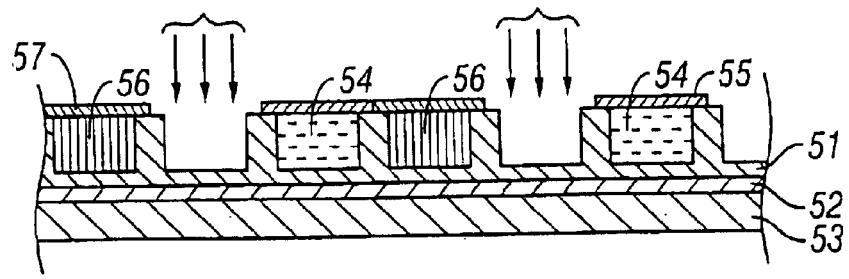
Figure 5F:
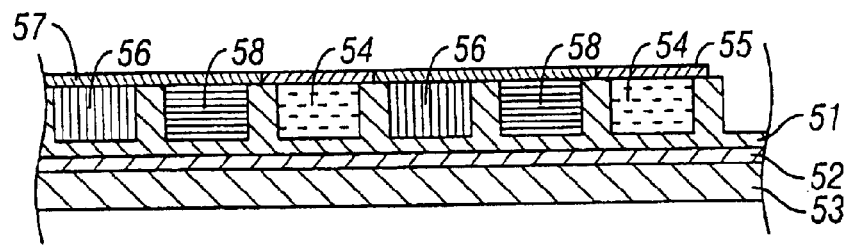
Figure 5G:
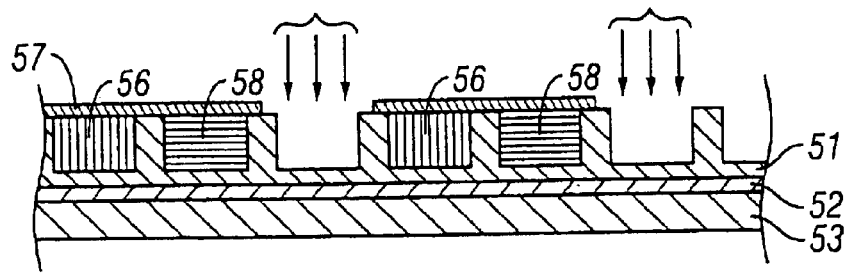
Figure 5H:
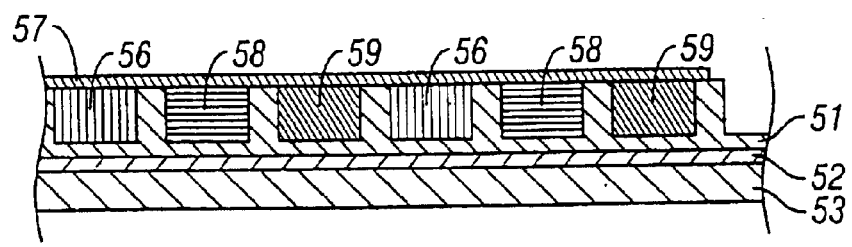

The filling and sealing of the opened microcups in a selected area are shown in FIG. 5d.

The complete manufacturing steps as described above may be repeated using other colored display fluids (58 and 59) to fill the microcups in the selected areas (FIGS. 5e–5h). The filled and sealed multicolor microcup array is then laminated onto a conductor film such as ITO on PET, optionally with an adhesive layer.

The manufacturing process as described may be carried out roll-to-roll continuously or semi-continuously to generate a single layer of thin, highly flexible and durable multi-color display panel with excellent color addressability for different applications.

III. Preparation of Multilayer Display

Figure 6A:
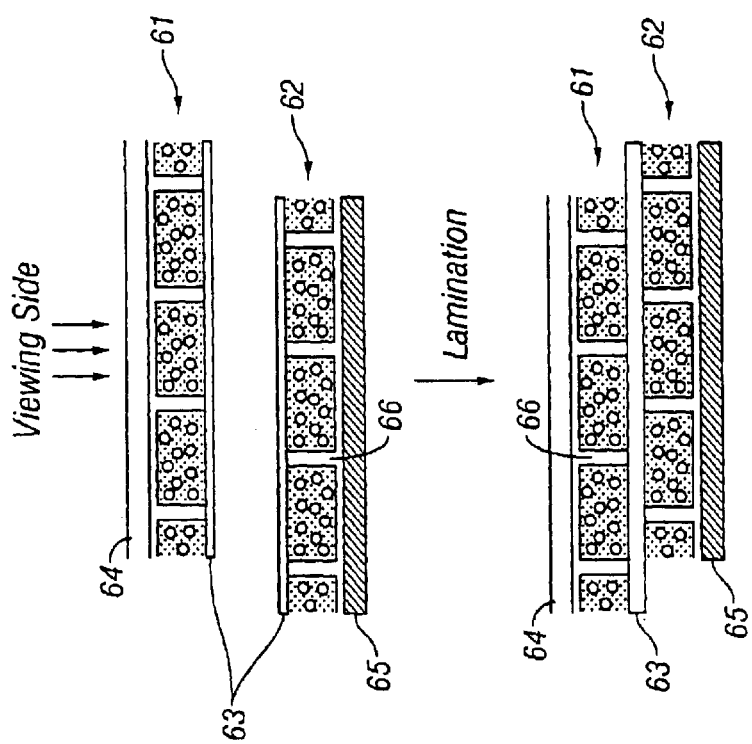
FIGS. 6a and 6b show the-methods for the manufacture of an electrophoretic display having two or more layers of display cells.
Figure 6B:
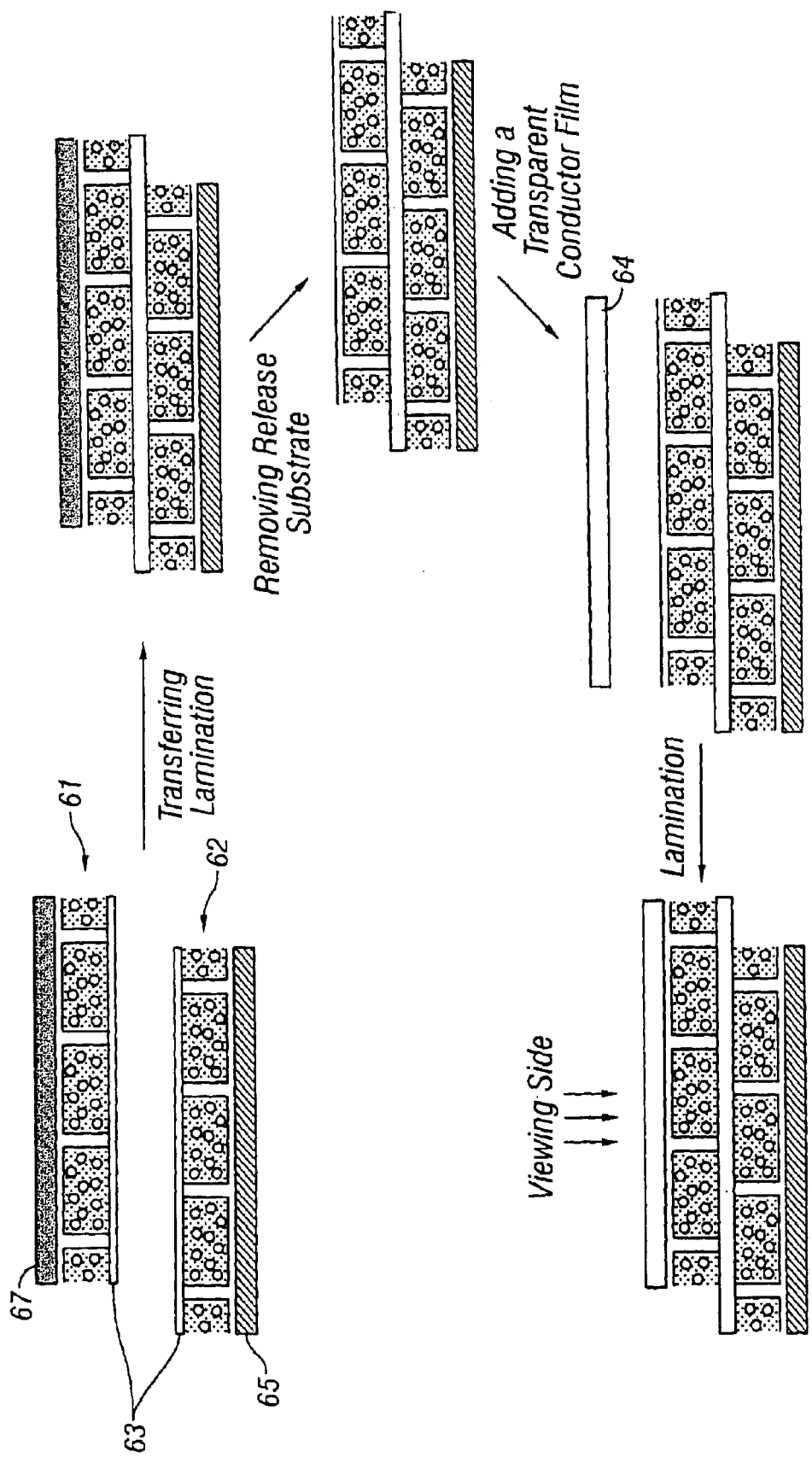

FIGS. 6a and 6b show the process of the present invention for the manufacture of an electrophoretic display having two or more layers of display cells.

FIG. 6a shows the process of preparing a two layer electrophoretic display by laminating a top layer (61) and a bottom layer (62) of display cells prepared by the procedure as described in Section II above. The filled display cells are individually sealed with a sealing layer (63). The conductor plate or film (64) on the viewing side is transparent and the conductor plate or film (65) on the non-viewing side may be blackened or colored. An adhesive layer may be used to facilitate the lamination process. The two layers (61 and 62) are arranged with the inactive partition areas (66) of one layer and the active cell areas of another layer in a staggered fashion.

FIG. 6b shows another process of preparing a two layer electrophoretic display by (i) preparing a layer of display cells (62) on a conductor plate or film (65) by the procedure as described in Section II above; (ii) preparing another layer of display cells (61) on a release substrate (67) by the same procedure in (i); (iii) laminating the layer of display cells (61) on the release substrate (67) onto the layer (62), optionally with an adhesive (not shown); (iv) removing the release substrate and (v) laminating the resultant composite film onto a conductor film (64), optionally with an adhesive (not shown). The steps (ii), (iii), and (iv) may be repeated to prepare an electrophoretic display having more than two layers of display cells.

In the two-layer or multilayer electrophoretic display as prepared above, it is important that the inactive partition areas of the upper microcup layer are arranged with the active microcup areas of the lower layer in a staggered manner. At least one of the two conductor films (64 and 65) is pre-patterned. Also at least the conductor film (64) on the viewing side is transparent.

EXAMPLES

The following examples are given to enable those skilled in the art to more clearly understand and to practice the present invention. They should not be considered as limiting the scope of the invention, but merely as being illustrative and representative thereof.

Example 1

Microcup Formulation

35 Parts by weight of Ebecryl 600 (UCB), 40 parts of SR-399 (Sartomer), 10 parts of Ebecryl 4827 (UCB), 7 parts of Ebecryl 1360 (UCB), 8 parts of HDDA (UCB), 0.05 parts of Irgacure 369 (Ciba Specialty Chemicals) and 0.01 parts of isopropyl thioxanthone (ITX, Aldrich) were mixed homogeneously and used for microembossing.

Example 2

Preparation of Microcup Array

A primer solution comprising of 5 parts of Ebecryl 830, 2.6 parts of SR-399 (Sartomer), 1.8 parts of Ebecry 1701,1 part of PMMA (Mw=350,000, Aldrich), 0.5 parts of Irgacure 500 and 40 parts of methyl ethyl ketone (MEK) was coated onto a 2 mil 60 ohm/sq. ITO/PET film (Sheldahl Inc., Minnesota) using a #3 Myrad bar, dried, and UV cured by using the Zeta 7410 (5 w/cm$^2$, Loctite) exposure unit for 15 minutes in air. The microcup formulation prepared in Example 1 was coated onto the treated ITO/PET film with a targeted thickness of about 50 µm, embossed with a Ni—Co male mold having a 60 (width)µm×60 (length)µm repetitive protrusion pattern with 10 µm wide partition lines and UV cured from the PET side for 20 seconds, removed from the mold with a 2" peeling bar at a speed of about 4–5 ft/min. Well-defined microcups with depth ranging from 10 to 50 µm were prepared by using male molds having corresponding protrusion heights.

Example 3: Comparative Example

Microcup Array Laminated With Novolac Photoresist

3 Gm/m$^2$ (dried) of the positively working photoresist SJR-5740 (Shipley, Mass.) was coated on a removable clear support PET4851 (Saint-Gobain, Mass.) with a Myrad bar. Onto the photoresist, 3 gm/m$^2$ (dried) of an alkali-developable adhesive composition comprising 9 parts of Nacor 72-8685 (50% solid, National Starch) and 91 parts of 20% aqueous solution of Carboset 515 (BF Goodrich) was then coated with a Myrad bar. The three-layer adhesive/resist/support was then laminated at 40° C. onto a 10 microns deep, empty microcup array prepared according to Example 2. The PET support was removed, and the photoresist laminated microcup array was imagewise exposed through a photomask using the Zeta 7410 (5 w/cm$^2$, Loctite) exposure unit for about 1 minute and then developed by Developer-453 (Shipley) for 2 minutes. Deterioration of resist integrity in the non-exposed regions such as pin holes and delamination of resist from the microcups was observed after the development step.

Example 4

Microcups Fully Filled With Photoresist

A 10 micron deep microcup array prepared according to Example 2 was corona treated with the BD-10 A corona surface treater (Electron-Technic Products, Inc, Chicago, Ill.) for about 1 minute, then coated with photoresist SJR-5740 (42.5% solid) by using a #8 Myrad bar. The resist thickness above the top surface of the microcups was measured to be about 3 microns. The coated microcup array was imagewise UV exposed using the Zeta 7410 exposure unit for about 1 minute and then developed by Developer-453 (Shipley) for 2 minutes. Good image discrimination with no deterioration of resist integrity on the partition wall in the non-exposed regions was observed. The exposure-development cycle was repeated once. No deterioration of resist integrity on the partition wall in the non-exposed regions was observed after the second development process.

Example 5: Comparative Example

Microcups Fully Filled With Photoresist

The same procedure was performed as in Example 4, except that a 40 micron deep microcup array was used and the exposure time and development time were increased to 2 minutes and 13 minutes, respectively. Some defects and undesirable development of the resist on the partition wall in the non-exposed area were observed after the second development process.

Example 6

Microcups Filled With Particulate Filler and Overcoated With Photoresist

A 35 micron depth microcup array prepared according to Example 2 was used. A filler composition containing 1 part of 10% aqueous solution of PVA 205 (Air Product) and 9 parts of a polystyrene latex (50% solid) was coated onto the microcups using a Universal Blade preset at a 25 micron gap opening. The microcup array was dried and an optical microscope examination was performed to confirm slightly under-filled microcups. The filled microcup array was over-coated with the positive photoresist SJR-5740 by using a Universal Blade preset at a 10 micron gap opening. The targeted thickness of the resist above the photoresist was 3 microns. After imagewise exposure for 30 seconds, the microcup array was developed with Developer-453 for 1 minute followed by a thorough rinse with de-ionized water. The exposure-development-washing cycle was repeated once. No deterioration of resist integrity on the partition wall in the non-exposed regions was observed after the second cycle.

Example 7

Microcups Filled With Particulate Filler and Coated With Photoresist

The same procedure was performed as in Example 6, except the polystyrene latex was replaced by ACqua220, ACqua240 and ACqua250 (Honeywell, N.J.) in three separate experiments. Excellent image discrimination without defect in the non-exposed regions was observed after the second cycle.

Examples 8–13

Fillers Containing Photosensitive Solubility Inhibitor

The same procedure was performed as in Example 6, except the filler was replaced by the composition shown in Table 1. Thus, 0–20% of a photoactive compound, 4-t-butylphenol 215 ester (St-Jean Photochemical) and 0–10% of polyvinylphenol (Aldrich, Mn=8000 or Mn=20,000) were added to the water dispersible resin AQ-1350 (Eastman Chemical) in MEK and coated onto microcups. The slightly under-filled microcups were blanket exposed for 2 minutes then overcoated with the photoresist SJR-5740 by using a Universal Blade preset at a 7 micron gap opening. The resist overcoated microcup array was imagewise exposed for 30 seconds and developed by the Developer453 for 2 minutes. The exposure-development cycle was repeated once. No deterioration of resist integrity on the partition wall in the non-exposed regions was observed after the second cycle.

TABLE 1

| | Fillers containing Exposed Photosensitive Solubility Inhibitor (parts by weight) | | | |
|---|---|---|---|---|
| Example No. | AQ-1350 | PAC | PVPL-8,000 | PVPL-20,000 |
| 8 | 100 | 0 | | |
| 9 | 100 | 10 | | |
| 10 | 100 | 10 | 10 | |
| 11 | 100 | 10 | | 10 |
| 12 | 100 | 20 | | |
| 13 | 100 | 20 | 10 | |

PAC=4-t-Butylphenol 215-ester; PVPL=Poly(4-vinyl phenol).

Example 14

Exposed Novolac Photoresist as the Filler

The same procedure was performed as in Examples 8–13, except the filler was replaced by the photoresist SJR-5740. The exposure-development cycle was repeated once. No deterioration of resist integrity on the partition wall in the non-exposed regions was observed after the second cycle.

Example 15

TiO$_2$ Dispersion 6.42 Grams of Ti Pure R706 (Du Pont) were dispersed with a homogenizer into a solution containing 1.94 grams of Fluorolink D (Ausimont), 0.22 grams of Fluorolink 7004 (Ausimont), 0.37 grams of a fluorinated copper phthalocyanine dye (3M) and 52.54 grams of perfluoro solvent HT-200 (Ausimont).

Example 16

TiO$_2$ Dispersion

The same procedure was performed as in Example 15, except the Ti Pure R706 and Fluorolink were replaced by a polymer coated TiO$_2$ particles PC-9003 (Elimentis, Highstown, N.J.) and Krytox (Du Pont), respectively.

Example 17

Microcup Sealing

A microcup array of 35 microns depth prepared in Example 2 was used. 85 Parts of the TiO$_2$ dispersion prepared in Example 15 were diluted with 15 parts of a perfluoro solvent FC-77 (3M) and coated onto microcups by using a Universal Blade Applicator with a 0.1 mil gap opening. A slightly underfilled microcup array was obtained. A 7.5% solution of polyisoprene in heptane was then overcoated onto the partially filled microcups by a Universal Blade Applicator with a 6 mil opening. The overcoated microcups were then dried at room temperature. A seamless sealing layer of about 6 micron thickness was observed under microscope. No entrapped air bubbles were observed in the sealed microcups.

Example 18

Microcup Sealing

The same procedure was performed as in Example 17, except the TiO$_2$ dispersion prepared in Example 16 was used. A seamless sealing layer of about 6 micron thickness was observed under microscope. No entrapped air bubbles were observed in the sealed microcups.

Preparation 1

Synthesis of a Multifunctional Reactive Protective Colloid $R_f$-amine

Formula (I)

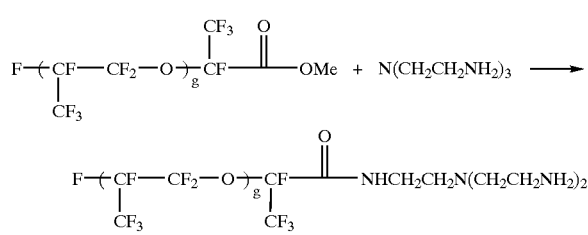

17.8 Gm of Krytox® methyl ester (DuPont, 17.8 g, MW=about ~1780, g=about 10, DuPont) was dissolved in a solvent mixture containing 12 gm of 1,1,2-trichlorotrifluoroethane (Aldrich) and 1.5 gm of α,α,α-trifluorotoluene (Aldrich). The resultant solution was added drop by drop into a solution containing 7.3 gm of tris(2-aminoethyl)amine (Aldrich) in 25 gm of α,α,α-trifluorotoluene and 30 gm of 1,1,2-trichlorotrifluoroethane over 2 hours with stirring at room temperature. The mixture was then stirred for another 8 hours to allow the reaction to complete. The IR spectrum of the crude product clearly indicated the disappearance of C=O vibration for methyl ester at 1780 cm$^{-1}$ and the appearance of C=O vibration for the amide product at 1695 cm$^{-1}$. Solvents were removed by rotary evaporation followed by vacuum stripping at 100° C. for 4–6 hours. The crude product was then dissolved in 50 ml of PFS2 solvent (low m.w. perfluoropolyether from Ausimont) and extracted with 20 ml of ethyl acetate three times, then dried to yield 17 gm of purified product ($R_f$-amine1 900) which showed excellent solubility in HT200. The product ($R_f$-amine 1780) showed good solubility in HT200.

Other reactive multifunctional $R_f$-amines of Formula (I) having different molecular weights such as $R_f$-amine4900 (g=about 30), $R_f$-amine2000 (g=about 11), $R_f$-amine800 (g=about 4) and $R_f$-amine650 (g=about 3) were also synthesized according to the same procedure.

Preparation 2

Preparation of TiO$_2$-containing Microcapsules 9.05 Gm of Desmodur® N3400 aliphatic polyisocyanate (from Bayer AG) and 0.49 gm of triethanolamine (99%, Dow) were dissolved in 3.79 gm of MEK. To the resultant solution, 13 gm of TiO$_2$ R706 (DuPont) was added and homogenized for 2 minutes with a rotor-stator homogenizer (IKA ULTRA-TURRAX T25, IKA WORKS) at ambient temperature. A solution containing 1.67 gm of 1,5-pentanediol (BASF), 1.35 gm of polypropylene oxide (m.w.=725, from Aldrich), 2.47 gm of MEK and 0.32 gm of a 2% dibutyltin dilaurate (Aldrich) solution in MEK was added and further homogenized for 2 minutes. In the final step, 0.9 gm of $R_f$-amine 4900 prepared from Preparation 1 in 40.0 gm of HT-200 (Ausimont) was added and homogenized for 2 minutes, followed by addition of additional 0.9 gm of $R_f$-amine 4900 in 33.0 gm of HT-200 and homogenization for 2 minutes. A low viscosity microcapsule dispersion was obtained.

The microcapsule dispersion obtained was heated at 80° C. overnight and stirred under low shear to post-cure the particles. The resultant microcapsule dispersion was filtered through a 400-mesh (38 micrometer) screen. The particle and the solid content of the filtered dispersion was measured to be 29 wt % by weight with an IR-200 Moisture Analyzer (Denver Instrument Company). The average particle size of the filtered dispersion was measured with a Beckman Coulter LS230 Particle Analyzer to be about 2 μm.

An EPD fluid containing 1.0 wt % by weight of CuPc—C$_8$F$_{17}$ (structure given below) and various amount of the resultant TiO$_2$-containing microcapsule dispersion in HT-200 was filled into the microcups which were then sealed and sandwiched between two ITO/PET films according to the procedure described in Preparation 3.

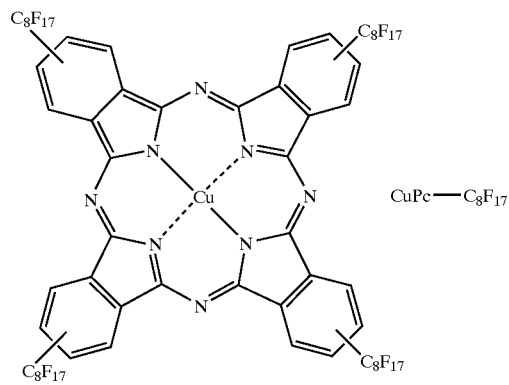

Preparation 3A

Primer Coated Transparent Conductor Film

A primer coating solution containing 33.2 gm of EB 600™ (UCB, Smyrna, Ga.), 16.12 gm of SR 399™ (Sartomer, Exton, Pa.), 16.12 gm of TMPTA (UCB, Smyrna, Ga.), 20.61 gm of HDODA (UCB, Smyrna, Ga.), 2 gm of Irgacure™ 369 (Ciba, Tarrytown, N.Y.), 0.1 gm of Irganox™ 1035 (Ciba), 44.35 gm of poly(ethyl methacrylate) (MW. 515,000, Aldrich, Milwaukee, Wis.) and 399.15 gm of MEK (methyl ethyl ketone) was mixed thoroughly and coated onto a 5 mil transparent conductor film (ITO/PET film, 5 mil OC50 from CPFilms, Martinsville, Va.) using a #4 drawdown bar. The coated ITO film was dried in an oven at 65° C. for 10 minutes and exposed to 1.8 J/cm$^2$ of UV light under nitrogen using a UV conveyer (DDU, Los Angles, Calif.).

Preparation 3B

Preparation of Microcups

TABLE 2

| Microcup Composition | | |
|---|---|---|
| Component | Weight Part | Source |
| EB 600 | 33.15 | UCB |
| SR 399 | 32.24 | Sartomer |
| HDDA | 20.61 | UCB |
| EB1360 | 6.00 | UCB |
| Hycar X43 | 8.00 | B F Goodrich |
| Irgacure 369 | 0.20 | Ciba |
| ITX | 0.04 | Aldrich |
| Antioxidant Ir1035 | 0.10 | Ciba |

33.15 Gm of EB 600™ (UCB, Smyrna, Ga.), 32.24 gm of SR 399™ (Sartomer, Exton, Pa.), 6 gm of EB1360™ (UCB, Smyrna, Ga.), 8 gm of Hycar 1300×43 (reactive liquid polymer, Noveon Inc. Cleveland, Ohio), 0.2 gm of Irgacure m 369 (Ciba, Tarrytown, N.Y.), 0.04 gm of ITX (Isopropyl-9H-thioxanthen-9-one, Aldrich, Milwaukee, Wis.), 0.1 gm of Irganox™ 1035 (Ciba, Tarrytown, N.Y.) and 20.61 gm of HDDA (1,6-hexanediol diacrylate, UCB, Smyrna, Ga.) were mixed thoroughly with a Stir-Pak mixer (Cole Parmer, Vernon, Ill.) at room temperature for about 1 hour and debubbled by a centrifuge at 2000 rpm for about 15 minutes.

The microcup composition was slowly coated onto a 4"×4" electroformed Ni male mold for an array of 100 μm (length)×100 μm (width)×25 μm (depth)×15 μm (width of top surface of the partition wall between cups) microcups. A plastic blade was used to remove excess of fluid and gently squeeze it into "valleys" of the Ni mold. The coated Ni mold was heated in an oven at 65° C. for 5 minutes and laminated with the primer coated ITO/PET film prepared in Preparation 3A, with the primer layer facing the Ni mold using a GBC Eagle 35 laminator (GBC, Northbrook, Ill.) preset at a roller temperature of 100° C., lamination speed of 1 ft/min and the roll gap at "heavy gauge". A UV curing station with a UV intensity of 2.5 mJ/cm$^2$ was used to cure the panel for 5 seconds. The ITO/PET film was then peeled away from the Ni mold at a peeling angle of about 30 degree to give a 4"×4" microcup array on ITO/PET. An acceptable release of the microcup array from the mold was observed. The thus obtained microcup array was further post-cured with a UV conveyor curing system (DDU, Los Angles, Calif.) with a UV dosage of 1.7 J/cm$^2$.

Preparation 3C

Filling and Sealing with a Sealing Composition

An electrophoretic fluid containing 9.7% by weight (dry weight) of the TiO$_2$-containing microcapsules prepared according to the Preparation 2, 1.0% by weight of CuPc—C$_8$F$_{17}$ and 0.5% by weight of R$_f$-amine2000 (based on the total dry weight of the TiO2-containing microcapsule) prepared according to Preparation 1 in HT-200 was filled into the 4"×4" microcup array prepared from Preparation 3B using a #0 drawdown bar. The excess of fluid was scraped away by a rubber blade.

A sealing composition containing 14% by weight of polyurethane IROSTIC P9815–20 (from Huntsman Polyurethane) in MEK/IPAc/CHO (47.5/47.5/5) was overcoated onto the filled microcups using a Universal Blade Applicator and dried at room temperature to form a seamless sealing layer of about 2–3 μm dry thickness with good uniformity.

The lamination of the electrode layer over the sealed microcups was accomplished by pressing the ITO side of an ITO/PET film (5 mil) onto the sealing layer by a laminator at 120° C. and at the speed of 20 cm/min.

Example 19: Comparative Example

Single Layer Microcup EPD

The resultant single layer microcup EPD prepared according to the Preparation 3C was then coated with a thin layer of black coating on the outer surface of the electrode on the sealing side of the display (the non-viewing side). The electrode film on the side opposite to the sealing layer is the viewing side from which all the electro-optic performances were measured. The test results including contrast ratio and Dmin at various normalized field strength are listed in Table 3.

Example 20

Staggered Two-layer Microcup EPD

An electrophoretic fluid containing 6.0% by weight (dry weight) of the TiO$_2$-containing microcapsules prepared according to Preparation 2, 1.0 wt % by weight of CuPc—C$_8$F$_{17}$ and 0.5% by weight (based on the total dry weight of the TiO$_2$-containing microparticles) of R$_f$-amine2000 (from Preparation 1) in HT200 was filled and sealed into a microcup array prepared in Preparation 3C (the lower layer). The sealed microcup layer was laminated onto a second sealed microcup layer (the upper layer) prepared in the Comparative Example 1 to form a staggered two-layer EPD film in which the inactive partition areas of the upper microcup layer were arranged in a staggered manner with registration to the active microcup areas of the lower layer. The resultant two-layer EPD film was evaluated as in the Comparative Example 19. The contrast ratio and Dmin at various normalized field strength measured from the upper layer side are also summarized in Table 3.

Example 21

Staggered Two-layer Microcup EPD

The same procedure of Example 20 was followed except that the upper microcup layer was filled with an electrophoretic fluid containing 9.7% by weight (dry weight) of TiO$_2$-containing microparticles from Preparation 2, 1.0% by weight of CuPc—C$_8$F$_{17}$ and 0.5% by weight (based upon the total dry weight of the TiO$_2$-containing microparticles) of R$_f$-amine2000 in HT200; and the lower microcup layer was filled with 9.7% by weight of the TiO$_2$-containing microparticles, 1.5% by weight of CuPc—C$_8$F$_{17}$ and 0.5% by weight (based upon the total dry weight of the TiO$_2$-containing microparticles) of R$_f$-amine 2000 in HT200. The contrast ratio and Dmin were shown to have been further improved by the increases in dye and particle concentrations in the lower layer. The contrast ratio and Dmin at various normalized field strength are summarized in Table 3.

Example 22

Stagqered Two-layer Microcup EPD

The same procedure of Example 20 was followed, except that the electrophoretic fluid of the upper microcup layer contained 9.7% by weight of the TiO$_2$-containing microparticles from Preparation 2, 0.7% by weight of CuPc—C$_8$F$_{17}$ and 0.5% by weight (based upon the total dry weight of the TiO$_2$-containing microparticles) of R$_f$-amine2000 in HT200; and the lower microcup layer contained 9.7% by weight of the TiO$_2$-containing microparticles, 1.5% by weight of CuPc—C$_8$F$_{17}$ and 0.5% by weight (based upon the total dry weight of the TiO$_2$-containing microparticles) of R$_f$-amine2000 in HT200. The contrast ratio and Dmin at various normalized field strength are summarized in Table 3.

TABLE 3

Contrast Ratios and Dmin of Examples 19~22

| | Upper Layer | | Lower Layer | | | Normalized Field Strength | | | |
|---|---|---|---|---|---|---|---|---|---|
| | wt % CuPc-C$_8$F$_{17}$ | wt % TiO$_2$ microparticle | wt % CuPc-C$_8$F$_{17}$ | wt % TiO$_2$ microparticle | | 10 | 20 | 30 | 40 |
| Comparative Example 19 | 1.0 | 9.7 | N.A. | N.A. | Contrast ratio | 2.50 | 9.00 | 9.20 | 9.50 |
| | | | | | Dmin | 0.84 | 0.76 | 0.76 | 0.75 |
| Example 20 | 1.0 | 9.7 | 1.0 | 6.0 | Contrast ratio | 3.50 | 12.30 | 13.50 | 14.00 |
| | | | | | Dmin | 0.76 | 0.69 | 0.69 | 0.68 |
| Example 21 | 1.0 | 9.7 | 1.5 | 9.7 | Contrast ratio | 2.50 | 14.50 | 17.00 | 19.00 |
| | | | | | Dmin | 0.78 | 0.66 | 0.66 | 0.65 |
| Example 22 | 2.0 | 9.7 | 1.5 | 9.7 | Contrast ratio | 5.00 | 8.00 | 9.50 | 9.50 |
| | | | | | Dmin | 0.75 | 0.67 | 0.65 | 0.65 |

It is evident from Table 3 that under the same normalized field strength, all of the two-layer EPDs (Examples 19–22) showed significantly higher contrast ratio and lower Dmin (higher reflectivity in the Dmin state) than the single layer EPD (Comparative Example 19).

While particular forms of the invention have been illustrated and described, it will be apparent that various modifications can be made without departing from the spirit and scope of the invention. Accordingly, it is not intended that the invention be limited, except as by the appended claims.

What is claimed:

1. A process for the preparation of a two-layer display, which process comprises:
   (a) preparing separately two display layers on conductor plates or films by:
      (i) forming display cells on separate conductor plates or films;
      (ii) filling said display cells with a filler material;
      (iii) overcoating the filled display cells with a positively working photoresist;
      (iv) selectively opening filled cells and removing the filler from the opened microcups;
      (v) filling the opened cells with a first display fluid into the opened cells;
      (vi) sealing said filled cells; and
      (vii) repeating steps (iv) through (vi) to form display cells filled display fluids of different colors; and
   (b) laminating two display layers prepared from (a) together, optionally with an adhesive layer.

2. A process for the preparation of a display of more than one layers of display cells, which process comprises:
   a) preparing a first layer of display cells on a conductor plate or film by:
      (i) forming display cells on a conductor plate or film;
      (ii) filling said display cells with a filler material;
      (iii) overcoating the filled display cells with a positively working photoresist;
      (iv) selectively opening filled cells and removing the filler from the opened microcups;
      (v) filling the opened cells with a first display fluid into the opened cells;
      (vi) sealing said filled cells; and
      (vii) repeating steps (iv) through (vi) above to form display cells filled with display fluids of different colors;
   b) preparing a second layer of display cells on a transfer release following steps a(i)–a(vii) except that conductor plate or film is replaced with a transfer release layer;
   c) laminating said second layer over said first layer and removing said transfer release layer;
   d) optionally preparing separately additional layers of display cells on transfer release layers following step (b);
   e) laminating said additional layers over the top layer in a stack of layers already formed and removing the transfer release layers; and
   f) laminating a second conductor film over the topmost layer of said stack.

3. The process of claim 2 wherein step (c) is carried out by laminating said second layer over said first layer with the sealing sides facing each other, followed by removing said transfer release layer.

4. The process of claim 2 wherein step (e) is carried out by laminating said additional layers over the top layer in said stack of layers already formed, with the sealing sides of the additional layers facing the layers underneath, followed by removing said transfer release layers.

5. The process of claim 2 wherein step (f) is carried out by lamination with or without an adhesive layer.

6. The process of claim 2 wherein said two or more layers are stacked in a staggered manner.

7. The process of claim 1 or 2 wherein said display fluids have different optical or electrical properties.

8. The process of claim 1 or 2 wherein said display cells are microcups, microgrooves or microchannels.

9. The process of claim 8 wherein said microcups have dimension in the range of about $10^2$ to about $10^6$ $\mu m^2$.

10. The process of claim 9 wherein said microcups have dimension in the range of about $10^3$ to about $10^5$ $\mu m^2$.

11. The process of claim 8 wherein said microcups have depth in the range of about 3 to about 100 $\mu m$.

12. The process of claim 11 wherein said microcups have depth in the range of about 10 to about 50 $\mu m$.

13. The process of claim 8 wherein said microcups have ratio of opening area to total area in the range of about 0.1 to about 0.95.

14. The process of claim 13 wherein said microcups have ratio of opening area to total area in the range of about 0.4 to about 0.90.

15. The process of claim 8 wherein said microcups have width in the range of about 2 to about 50 $\mu m$.

16. The process of claim 15 wherein said microcups have width in the range of about 5 to about 20 $\mu m$.

17. The process of claim 8 wherein said microgrooves or microchannels have dimension in the range of 5 to 200 $\mu m$ (depth)×10 to 300 $\mu m$ (width or diameter)×300 $\mu m$ to 90 inches (length).

18. The process of claim 17 wherein said microgrooves or microchannels have dimension in the range of 10 to 50 μm (depth)×50 to 120 μm (width or diameter)×1000 μm to 40 inches (length).

19. The process of claim 1 or 2 wherein said display cells have cell gap or the shortest distance between the two electrodes in a multilayer display is in the range of about 15 to about 200 μm.

20. The process of claim 19 wherein said display cells have cell gap or the shortest distance between the two electrodes in a multilayer display is in the range of about 20 to about 50 μm.

21. The process of claim 1 or 2 wherein the thickness of each display cell layer is in the range of about 10 to about 100 μm.

22. The process of claim 21 wherein the thickness of each display cell layer is in the range of about 12 to about 30 μm.

23. The process of claim 1 or 2 wherein said display fluid is an electrophoretic fluid.

24. The process of claim 1 or 2 wherein said display fluid comprises a liquid crystal.

25. The process of claim 24 further comprising a dichroic dye.

26. The process of claim 1 or 2 wherein said display fluid comprises magnetic particles.

27. The process of claim 1 or 2 wherein said display cells are prepared by the microembossing process.

28. The process of claim 1 or 2 wherein said display cells of different layers are prepared by different methods.

29. The process of claim 28 wherein said methods are microembossing, photolithography or pre-punched holes.

30. The process of claim 1 or 2 wherein said filler material is capable of being readily removed from the cells by using a developer or cleaning solution which is a weak solvent or non-solvent for the non-exposed photoresist, but is a good solvent or dispersion medium for the filler.

31. The process of claim 30 wherein said developer or cleaning solution is an aqueous solution.

32. The process of claim 30 wherein said developing solution is a base developer selected from the group consisting of alkaline solutions, Developer-351 and Developer-453.

33. The process of claim 30 wherein said developing solution contains an additive.

34. The process of claim 33 wherein said additive is a surfactant or dispersing agent.

35. The process of claim 1 or 2 wherein said filler material is selected from the group consisting of organic, inorganic and polymer particulates, water soluble and dispersible polymers and mixtures thereof.

36. The process of claim 1 or 2 wherein said filler material is selected from the group consisting of AQ branched polyesters, Carboset® Polymers, poly(vinyl alcohol), polyvinylpyrrolidone, poly(4-vinyl phenol), pre-exposed positive photoresists, polyacrylic acid, polymethacrylic acid, and their copolymers, ACqua220, ACqua240, and ACqua250 dispersions, non-film forming latexes including PMMA and polystyrene latexes, colloidal silica and mixtures thereof.

37. The process of claim 1 or 2 wherein said filler material contains additives selected from the group consisting of surfactants, dispersing agents and photosensitive dissolution-inhibiting compounds.

38. The process of claim 37 wherein said photosensitive dissolution-inhibiting compound is a diazide compound.

39. The process of claim 1 or 2 wherein said filler material is pre-exposed positive working novolac photoresist.

40. The process of claim 1 or 2 wherein selectively opening of the filled cells is carried out by imagewise exposing the positive photoresist and removing the exposed photoresist and the filler material therein.

41. The process of claim 40 wherein said photoresist is selected from the group consisting of the novolac-based photoresist S-1818, SJR-1075, SJR-3000, SJR-5440, SJR-5740, AZ-9260, AZ-4620, AZ4562, THB-Positive and mixtures thereof.

42. The process of claim 40 wherein said photoresist is a polyvinylphenol-based photoresist.

43. The process of claim 40 wherein said photoresist is a t-BOC derivative of a polyvinylphenol-based photoresist.

44. The process of claim 40 wherein said exposing step is performed by UV radiation, visible light or other radiation sources.

45. The process of claim 44 further comprising a step of soft baking the photoresist before said exposure step.

46. The process of claim 1 or 2 further comprising the step of washing the opened cells with a solvent or a mixture of solvents.

47. The process of claim 46 wherein said solvent is distilled water or deionized water.

48. The process of claim 1 wherein step (b) is carried out by laminating one layer of display cells over the other display layer with the sealing sides facing each other.

49. The process of claim 1 wherein step (b) is carried out by laminating one layer of display cells over the other display layer in a staggered manner.

50. The process of claim 1 or 2 wherein the filling of the display fluids in display cells is carried out by coating or printing.

51. The process of claim 50 wherein said printing is inkjet printing or screen printing.

* * * * *